United States Patent [19]

Tabone

[11] Patent Number: 5,142,598
[45] Date of Patent: Aug. 25, 1992

[54] FIBER OPTIC CONNECTOR HAVING SNAP RING ADJUSTMENT MEANS

[75] Inventor: Peter P. Tabone, Kings Park, N.Y.

[73] Assignee: Porta Systems Corp., Syosset, N.Y.

[21] Appl. No.: 751,868

[22] Filed: Aug. 28, 1991

[51] Int. Cl.⁵ ............................................. G02B 6/36
[52] U.S. Cl. ........................................ 385/78; 385/53; 385/77
[58] Field of Search ...................... 385/78, 76, 77, 53, 385/55

[56] References Cited

U.S. PATENT DOCUMENTS

| | | | |
|---|---|---|---|
| 4,726,647 | 2/1988 | Kakii et al. | 385/78 X |
| 4,787,699 | 11/1988 | Moulin | 385/80 |
| 5,052,774 | 10/1991 | Bulman et al. | 385/76 X |
| 5,054,879 | 10/1991 | Brown | 385/78 X |

Primary Examiner—John D. Lee
Assistant Examiner—Phan Thi Heartney
Attorney, Agent, or Firm—Charles E. Temko

[57] ABSTRACT

A fiber optic connector of the so-called D-4 type incorporating means for incrementally adjusting the fiber core supporting ferrule with respect to an alignment projection which engages a corresponding recess in an adapter when the connector is engaged with the adapter. In addition to the usual radially arranged slots in a key member which are selectively engaged by a corresponding projection on a ferrule supporting element during the adjustment procedure, the device includes a slidably mounted snap ring which is pushed into locked engagement to prevent loss of final adjustment. The snap ring is moved to this position by a selectively engageable adjustment tool which also serves as a protective cap.

3 Claims, 5 Drawing Sheets

FIBER OPTIC CONNECTOR HAVING SNAP RING ADJUSTMENT MEANS

BACKGROUND OF THE INVENTION

This invention relates generally to the field of signal transmission through fiber optic cables, and more particularly to an improved connector plug of the so-called D-4 type which is permanently engaged to a terminated fiber, and selectively coupled to an adapter at one end thereof, the adapter coupling to a similar plug at another end thereof whereby the terminated fibers of each connector are placed in abutted coaxial relation for light transmission therebetween. Devices of this general type are well known in the art, and the invention lies in specific constructional details relative to incorporated means for aligning the optical centers of the fibers as closely as possible for maximum light transmission.

The known D-4 type plugs include means for adjusting the rotational relation between the terminated fiber and an alignment projection on the body of the plug for this purpose. The adjustment procedure usually includes the making of a first adjustment, the assembly of a pair of connectors to the adapter, following which a quantitative test of light transmission is made using a meter. One of the connections is then disconnected, and the above described adjustment is made in serial increments with a trial measurement for each increment until maximum light transmission is obtained.

SUMMARY OF THE INVENTION

Briefly stated, the invention contemplates the provision of an improved so-called D-4 type incorporating means for incrementally adjusting the fiber core supporting ferrule with respect to an alignment projection which engages a corresponding recess in an adapter when the connector is engaged with the adapter. In addition to the usual radially arranged slots in a key member which are selectively engaged by a corresponding projection on a ferrule supporting element during the adjustment procedure, the device includes a slidably mounted snap ring which is pushed into locked engagement to prevent loss of final adjustment. The snap ring is moved to this position by a selectively engageable adjustment tool which also serves as a protective cap. When the tool is subsequently removed, the adjustment cannot be altered without use of another specialized tool.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
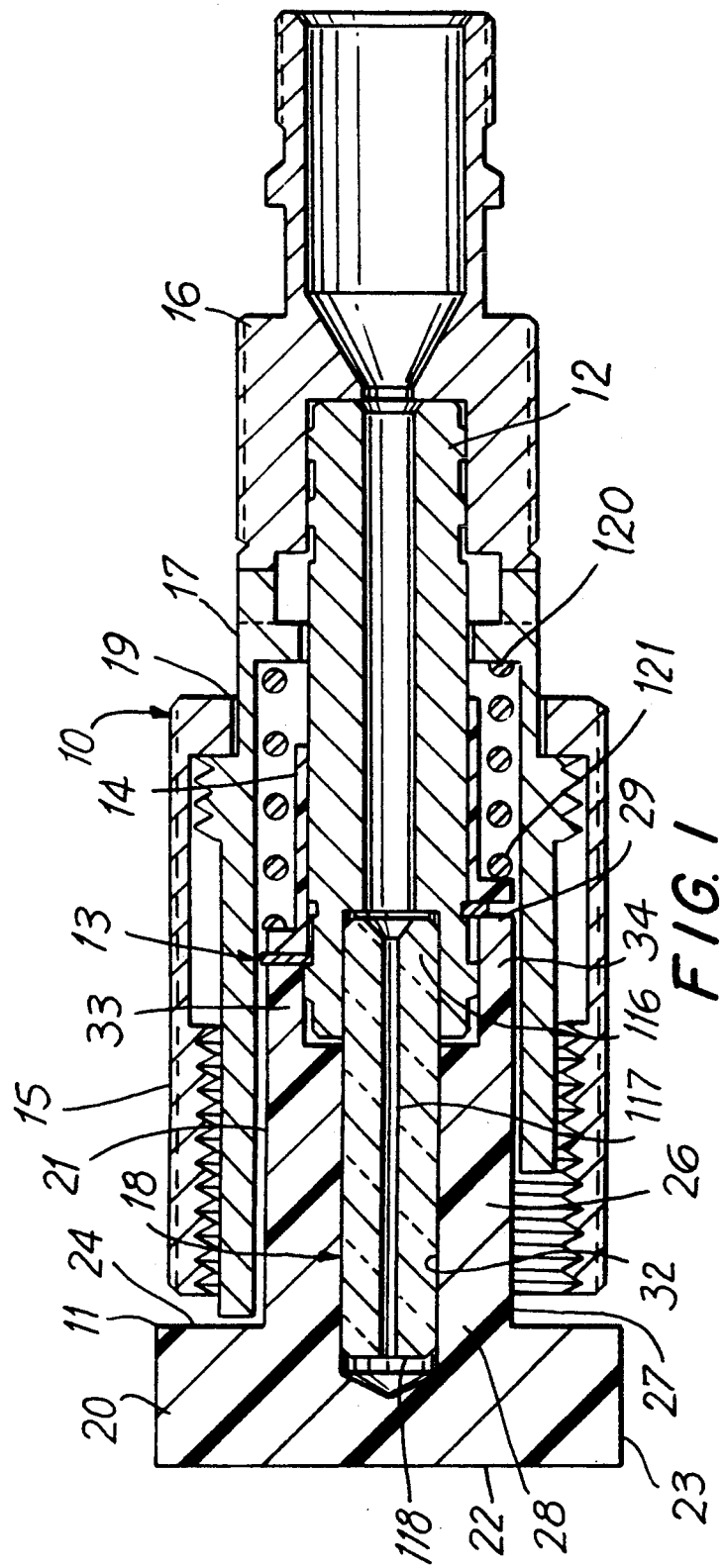
FIG. 1 is a longitudinal central sectional view of a plug connector embodying the invention.
Figure 2:
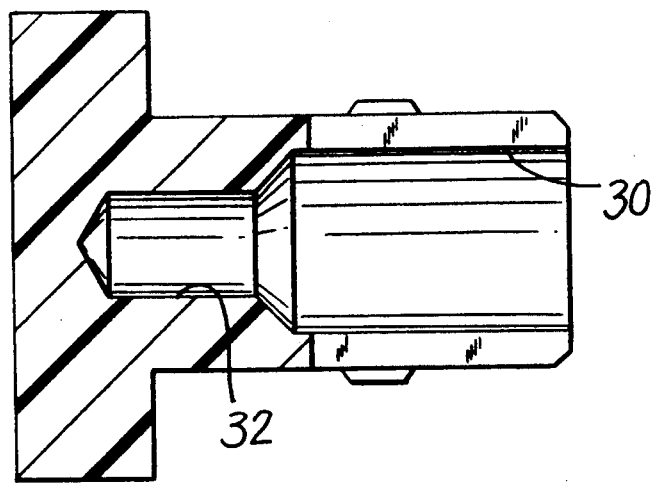
FIG. 2 is a longitudinal sectional view of a combination protective cap and tool forming a part of the embodiment.

Referring to FIG. 1 in the drawings, in accordance with the invention, the device, generally indicated by reference character 10 comprises broadly: a cap and tool element 11, a ferrule supporting inner body element 12, a retaining ring 13, a stop bushing 14, a coupling nut 15, a cable engaging body element 16, a key body 17, a ceramic ferrule 18, and a tension spring 19.

Figure 3:
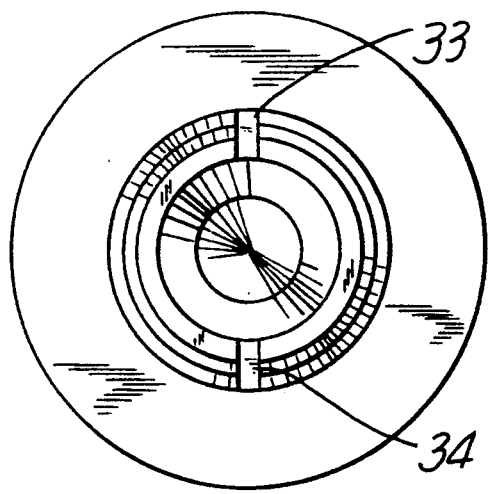
FIG. 3 is an end elevational view as seen from the right hand portion of FIG. 2.
Figure 4:
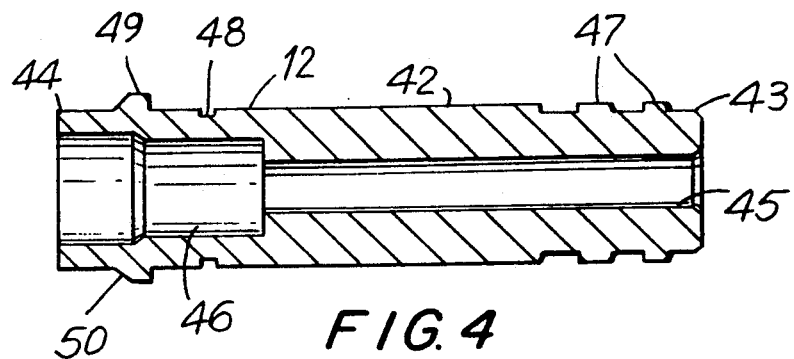
FIG. 4 is a longitudinal sectional view of an inner ferrule supporting body element.

The cap and tool 11 is preferably formed of molded nylon, and includes a head member 20 and an elongated shank member 21. The head member 20 is bounded by an outer end surface 22, a cylindrical surface 23 and a radial surface 24. The shank member 21 includes a cylindrical tube member 26 having an outer surface 27 extending between an inner end 28 and an outer end 29. A cylindrical bore 30 (FIG. 3) engages the body 12 and an inner bore 32 which surrounds the ferrule 18. A pair of planar slots 33 and 34 (see FIG. 3) extend axially from the free end of the shank member 21, and selectively contact the retaining ring 13, as will more fully appear.

The ferrule supporting inner element 12 is preferably formed as a precision die casting, and is of generally tubular configuration. It includes an outer surface 42 extending between first and second ends 43 and 44 and defines a cylindrical bore 45 and communicating counter bore 46. The first end 43 is provided with annular rings 47 for the force fitting of the element 16. The second end defines an annular recess 48 selectively engaging the ring 13. An annular ring 49 retains the ring 13 in an initial position, and includes a camming surface 50 which facilitates movement of the tool element 11 therepast.

Figure 5:
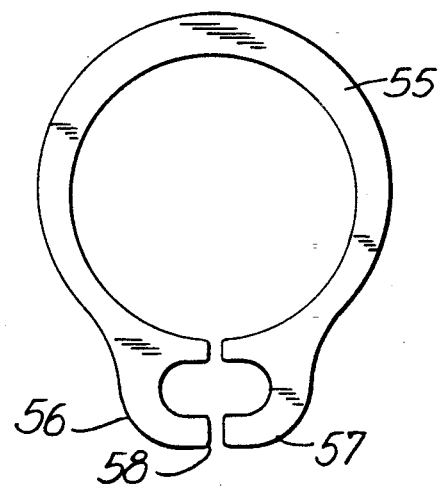
FIG. 5 is a side elevational view of a snap ring member.

The retaining ring 13 is illustrated in FIG. 5, and is preferably formed from nickel plated beryllium copper. It includes a circular ring portion 55 terminating in a pair of tool engaging terminals 56 and 57 which define a spreadable gap 58 therebetween. Rotation is facilitated by the fact that the ring rides against the stop bushing 14, which being formed of a smooth relatively hard synthetic resinous material offers little frictional resistance to such rotation.

Figure 6:
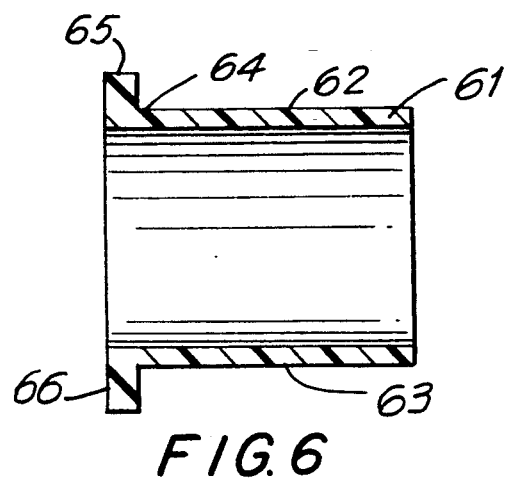
FIG. 6 is a longitudinal sectional view of a stop bushing.
Figure 7:
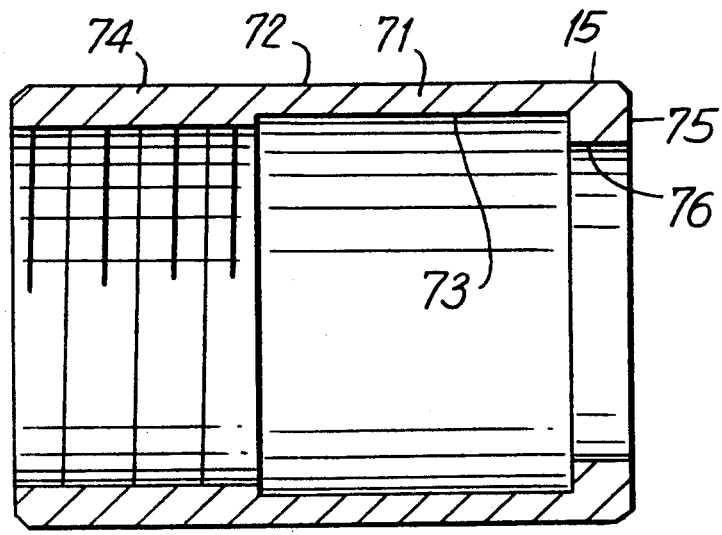
FIG. 7 is a longitudinal sectional view of a coupling nut.
Figure 8:
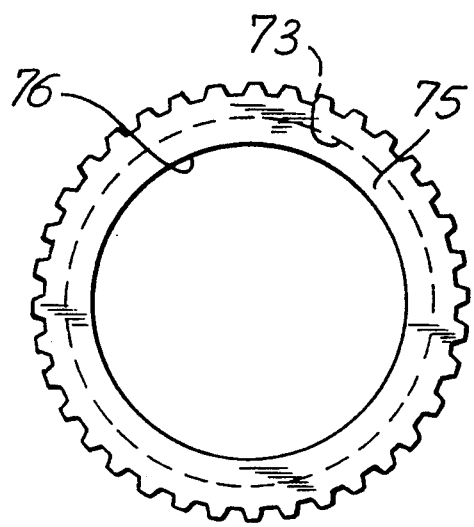
FIG. 8 is an end elevational view as seen from the right hand portion of FIG. 7.

The stop bushing 14 (FIG. 6), as mentioned above, is formed as a synthetic resinous molding, and includes a cylindrical body 61 bounding by inner and outer surfaces 62 and 63. One end 64 mounts a radially extending flange 65, the outer surface 66 of which bears against the ring 13.

The coupling nut 15 is also formed as a zinc die casting, and is of generally conventional configuration, including a cylindrical sidewall 71 bounded by an outer surface 72 and an inner surface 73 having a threaded portion 74 which engages corresponding threads (not shown) on an adapter. An end wall 75 defines a centrally disposed bore 76.

Figure 9:
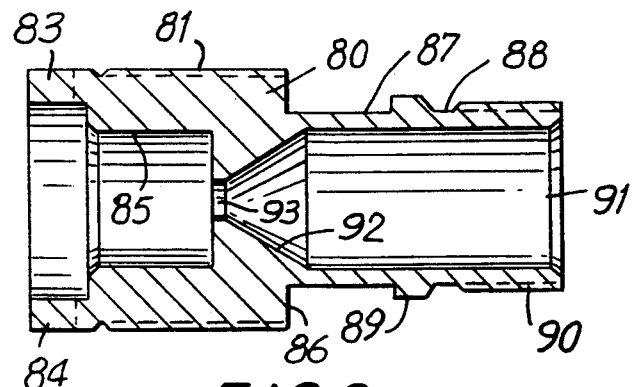
FIG. 9 is a longitudinal sectional view of a cable engaging body element.
Figure 10:
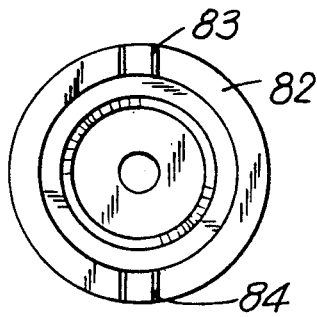
FIG. 10 is an end elevational view thereof as seen from the left hand portion of FIG. 9.
Figure 11:
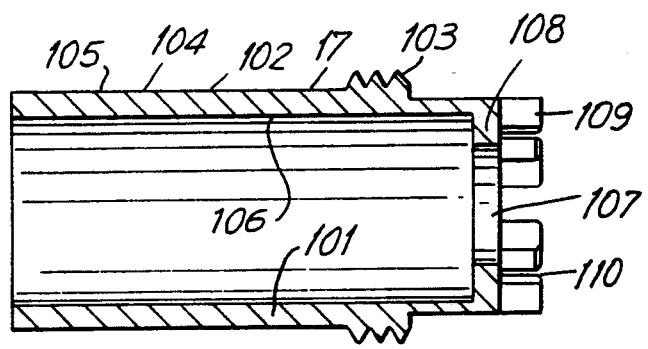
FIG. 11 is a longitudinal sectional view of a key body.
Figure 12:
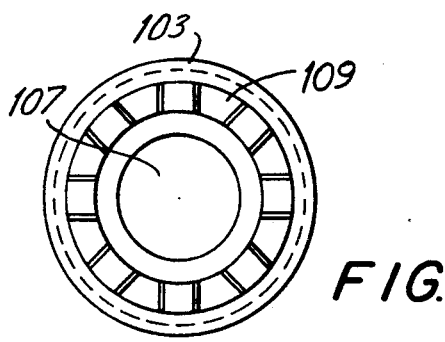
FIG. 12 is an end elevational view thereof as seen from the right hand portion of FIG. 11.

The cable engaging body element 16 (FIG. 9), again, is a zinc die casting, and includes a main body portion 80 having a knurled outer surface 81 which is manually engaged during adjustment. An end surface 82 mounts first and second locking projections 83 and 84. A first bore 85 frictionally engages the body element 12. End surface 86 merges with a hollow tubular projection 87, an outer surface 88 of which defines annular rings 89 and 90 for engaging a synthetic resinous strain relief member (not shown) of known type. A relatively large bore 91 communicates with a conical bore 92 and smaller bore 93 aligned with the bore in the ferrule 18.

The key body 17, a die casting, includes a tubular body 101, an outer surface 102 of which includes a threaded portion 103 which serves to retain the coupling nut 15. A first end 104 includes a projection 105 which engages the adapter in known manner. A centrally disposed bore 106 leads to a smaller bore 107 in an end wall 108, an outer surface of which mounts a plurality of integrally formed accurately spaced projections 109 separated by slots 110 which selectively engage the projections 83 and 84.

The ferrule 18 is preferably of known ceramic type. A first end 116 engages the inner body element 12. A centrally disposed bore 117 supports a fiber core (not shown) which extends to an outer surface 118 at an opposite end.

The tension spring 19 is conventional, a first end 120 engaging the key body, and a second end 121 engaging the flange of the stop bushing.

Aside from the retaining ring 13, the device is maintained in assembled condition solely by frictional engagement of certain of the component parts. Assembly is commenced by first sliding the ring 13 upon the outer surface of the inner body element 12 to the position shown in the upper portion of FIG. 1. Next the stop bushing 14 is engaged from an opposite end and moved to engage the ring 13. The spring 19 is then engaged to surround the stop ring, following which the key body is applied to surround the spring.

Next, the inner body element 12 is force fitted to the cable engaging body element 16 to maintain all of the above mentioned parts in position as shown in FIG. 1. In this condition the coupling nut 15 is fitted by running the threads on the inner surface of the same past the threads on the key body. The fiber cable may be then fitted in known manner and the terminal end of the core polished as known in the art.

The process of matching the optical access of the core with respect to the optical access of another fiber in a mating plug connector is performed in a conventional manner. This process normally requires assembly of the device with the adapter along with the assembly of the corresponding plug connector and reference cable, following which an initial light transmission test is made using a meter connected to the reference cable. Next, the device 10 is discontinued and the ferrule is rotated through a predetermined increment by pulling and rotating element 16 against the action of spring 19. Another trial is made, and the result noted. The process is continued until optimum light transmission is obtained, following which the device is once again disconnected from the adapter, and the tool 11 is pressed inwardly to move the retaining ring 55 from the position shown in the upper portion of FIG. 1 to the lower portion of FIG. 1 wherein it enters the recess 48. This movement will prevent further longitudinal movement of element 16 sufficient to allow rotation. The device may then be disconnected and reconnected to an adapter without loss of this adjustment. Once this condition has occurred, the tool 11 is incapable of opening the ring 13, and serves merely as a protective cap for the ferrule. However, the ring can be opened if necessary by use of a separate tool (not shown) which engages the terminals 56–57 and then spreads the ring to allow it to be moved out of the recess and slid back to the original position against the shoulder of bushing 14.

I wish it to be understood that I do not consider the invention to be limited to the precise details of structure shown and set forth in this specification, for obvious modifications will occur to those skilled in the art to which the invention pertains.

I claim:

1. A fiber optic plug connector comprising: a selectively engageable tool element, a ferrule supporting inner body element having first and second ends and a cylindrical outer surface having an annular locking recess therein, a ferrule supported at said first end thereof, a resilient retaining ring surrounding said inner body element and selectively engaging said locking recess, a cable engaging body element coupled in coaxial relation to said second end of said inner body element, a stop bushing surrounding said first end of said inner body element, a key body having first and second ends surrounding said inner body element and stop bushing and having an axially oriented aligning projection extending from said first end, said second end defining a plurality of accurately arranged slots; said cable engaging body element having corresponding projections selectively engaging said slots; a compression spring interconnecting said stop bushing and said key body and resiliently urging said stop bushing against said retaining ring; said tool element having an operative end thereof selectively engaging said retaining ring for the transmission of longitudinal movement to said retaining ring toward said locking recess; said movement serving to retain engagement of said key body with said cable engaging body element to prevent relative rotation therebetween.

2. A plug connector in accordance with claim 1, in which said tool element includes a first axially disposed bore surrounding said inner body element at said first end thereof, and a communicating counter bore providing clearance for said ferrule.

3. A plug connector in accordance with claim 1, in which said stop bushing is formed of synthetic resinous material having a low coefficient of friction, to facilitate relative rotation of said retaining ring.

* * * * *